United States Patent
Pora

(10) Patent No.: US 11,105,271 B2
(45) Date of Patent: Aug. 31, 2021

(54) CIRCUIT AND METHOD FOR METERING FUEL WITH COMPENSATION FOR VARIATIONS IN THE DENSITY OF THE FUEL

(71) Applicant: Safran Aircraft Engines, Paris (FR)

(72) Inventor: Loic Pora, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 123 days.

(21) Appl. No.: 16/311,407

(22) PCT Filed: Jun. 27, 2017

(86) PCT No.: PCT/FR2017/051713
§ 371 (c)(1),
(2) Date: Dec. 19, 2018

(87) PCT Pub. No.: WO2018/002511
PCT Pub. Date: Jan. 4, 2018

(65) Prior Publication Data
US 2019/0242304 A1   Aug. 8, 2019

(30) Foreign Application Priority Data

Jun. 27, 2016 (FR) ..................... 16 55944

(51) Int. Cl.
*F02C 9/38* (2006.01)
*F02C 7/232* (2006.01)
(Continued)

(52) U.S. Cl.
CPC ............... *F02C 9/38* (2013.01); *F02C 7/222* (2013.01); *F02C 7/232* (2013.01); *F02C 9/32* (2013.01);
(Continued)

(58) Field of Classification Search
CPC .. F02C 9/38; F02C 7/222; F02C 7/232; F02C 9/32; F05D 2270/3015; F05D 2270/306; F16K 17/30
See application file for complete search history.

(56) References Cited

U.S. PATENT DOCUMENTS 2,917,067 A     12/1959  Pearl
4,394,811 A  *  7/1983  Swick ...................... F02C 9/38
                                                         60/39.281
(Continued)

FOREIGN PATENT DOCUMENTS

FR     2 806 488 A1    9/2001
FR     2 923 871 A1    5/2009

OTHER PUBLICATIONS

International Search Report dated Oct. 20, 2017 in PCT/FR2017/051713 filed on Jun. 27, 2017.
(Continued)

*Primary Examiner* — P. Macade Nichols
(74) *Attorney, Agent, or Firm* — Oblon, McClelland, Maier & Neustadt, L.L.P.

(57) ABSTRACT

A circuit for metering fuel for a turbomachine, including a fuel metering element, a pump designed to pump a flow of fuel to the metering element, and a control valve designed to return, toward the pump, an excess flow of fuel delivered to the metering element as a function of a fuel pressure difference at the terminals of the metering element, the control valve is designed to modulate the excess flow returned toward the pump as a function of variations in the density of the fuel delivered to the metering element. A turbomachine can include such a circuit.

8 Claims, 3 Drawing Sheets

(51) Int. Cl.
    *F02C 9/32*         (2006.01)
    *F02C 7/22*         (2006.01)
    *F16K 11/07*      (2006.01)

(52) U.S. Cl.
    CPC ........ *F16K 11/07* (2013.01); *F05D 2270/306* (2013.01); *F05D 2270/3015* (2013.01)

(56) References Cited

U.S. PATENT DOCUMENTS

| | | |
|---|---|---|
| 2001/0022079 A1 | 9/2001 | Blot-Carretero et al. |
| 2002/0184885 A1 | 12/2002 | Blot-Carretero et al. |
| 2004/0177602 A1* | 9/2004 | Griffiths .................. F02C 9/263 60/39.281 |
| 2009/0301575 A1 | 12/2009 | Arnett |
| 2010/0257867 A1 | 10/2010 | Aurousseau et al. |

OTHER PUBLICATIONS

French Preliminary Search Report dated Mar. 10, 2017 in Patent Application No. FR 1655944 (with English translation of categories of cited documents), 3 pages.

* cited by examiner

CIRCUIT AND METHOD FOR METERING FUEL WITH COMPENSATION FOR VARIATIONS IN THE DENSITY OF THE FUEL

FIELD OF THE INVENTION

The invention relates to a fuel metering circuit of a turbomachine, and a metering method able to be implemented by said circuit.

PRIOR ART

A turbomachine conventionally comprises a fuel metering circuit comprising a fuel metering element delivering, to the combustion chamber of the turbomachine, a fuel flow adapted to the operating regime of the turbomachine.

The metering circuit also comprises a pump to extract fuel from the fuel tank of the turbomachine for conveying thereof towards the metering element, and a control valve which allows an excess fuel flow delivered to the metering element to be recirculated towards the pump.

Each operating regime of the turbomachine imposes a corresponding mass fuel flow to be delivered by the metering element. With reference to FIG. 1, the density is shown of different types of fuel (each curve numbered 1 to 4 corresponding to a different fuel, the curve numbered 5 corresponding to an example of engine size), as a function of temperature. It can be seen in this Figure that the density of a fuel can vary to a large extent, in particular as a function of the type of fuel used (fuels of greater or lesser volatility) and of fuel temperature. Currently, metering elements are controlled by control laws relating a desired target mass flow to a position of the metering element, at fixed conditions of temperature and type of fuel.

As a result, these control laws do not allow controlling of the metering element to take into account the variability in fuel density, and therefore do not allow precise adapting of the metered mass flow to the fuel density, to obtain the target mass flow.

Furthermore, it is not possible to have precise knowledge of the mass flow delivered by the metering element since the flowmeters used to determine the quantity of fuel delivered by the metering element are volumetric flowmeters, mass flowmeters not having sufficient reactivity to provide reliable information adapted to every instant of the operating regime.

The result is major imprecision, in the region of 10%, regarding the mass flow delivered by the metering element to the fuel combustion chamber.

It is possible to calculate the percentage imprecision of the flow delivered by the metering element, resulting from lack of knowledge of the fuel density, using the following formula expressing the delivered flow:

$$Wf = K \cdot S \cdot \sqrt{\rho \cdot \Delta P}$$

Where:
Wf is the mass flow injected by the metering element, in kg/h
$\rho$ is the fuel density, in kg/L
K is a constant, and
S is the cross-section of a slot in the metering element, in mm².

The impact of density on the injected flow is the following:

$$\frac{dWf}{Wf} = -\frac{1}{2} \cdot \left(\frac{d\rho}{\rho}\right)$$

Density varying from 700 to 900 kg/m³ creates imprecision of the injected mass flow of between −6.4 and 6.1%, in relation to a law calculated with a mean density of 803 kg/m³.

Yet this imprecision impacts the sizing of the turbomachine.

In particular, a major change in the regime of the turbomachine e.g. from a high regime to a slow regime or conversely, causes a sudden variation in the flow delivered to the combustion chamber. This variation takes place in a shorter time than the variation in rotation speed of the turbomachine. Operating tolerances, known as pumping and flameout margins, must therefore be defined so that the turbomachine continues to operate despite a delivered flow differing from the minimum needed for operation and adapted to its current rotation speed, these tolerances being obtained by oversizing the turbomachine.

Because of the major imprecision regarding the flow delivered by the metering element, tolerances and the oversizing of the turbomachine must be even greater.

Some solutions have been put forward, comprising the use of a temperature sensor combined with a computer to correct control over the metering element in accordance with compensation laws determined as a function of the density or temperature of the fuel.

However, this solution only allows correction of some of the temperature-related differences, and adds other sources of uncertainty related to determination of the law.

SUMMARY OF THE INVENTION

The aim of the invention is to overcome the disadvantages of the prior art by proposing a fuel metering system having increased precision of metered flow compared with the prior art.

In particular, one aim of the invention is to propose a fuel metering system which allows adapting of the metered fuel flow as a function of the fuel density.

In this respect, the subject of the invention is a fuel metering circuit for turbomachine, comprising:
- a fuel metering element,
- a pump adapted to circulate a fuel flow towards the metering element, and
- a control valve adapted to return, towards the pump, an excess fuel flow delivered to the metering element, as a function of a difference in fuel pressure at the terminals of the metering element.

The control valve is adapted to modulate the excess flow returned towards the pump as a function of variations in the fuel density delivered to the metering element.

The fuel metering circuit further comprises a high-pressure line for feeding the metering element and a low-pressure line for returning to the pump.

Said circuit also comprises:
- a flow extraction line connecting the high-pressure line to a chamber of the control valve, said line comprising a pump adapted to deliver to said chamber a constant fuel flow at a pressure higher than the pressure of the fuel in the high-pressure line, and
- a flow return line connecting the chamber to a fuel recirculation inlet of the high-pressure line, said line comprising a diaphragm, said lines ensuring the feeding of the chamber with a constant fuel flow the pressure of which is solely dependent on the fuel density.

The circuit may further comprise a high-pressure feed line to the metering element and a low-pressure return line to the pump, and the control valve may then comprise:
- a cylinder and slide gate mobile in translation within the cylinder,
- an inlet orifice arranged in the cylinder and connected to the high-pressure line,
- an outlet orifice arranged in the cylinder and connected to the low-pressure line,
- the control valve being conformed so that movement of the slide gate in the cylinder causes a variation in the fuel flow circulating from the inlet orifice to the outlet orifice,
- the slide gate comprising two movement-controlling end sections respectively connected to the high-pressure line and low-pressure line, and further comprising an additional movement-controlling section adapted to modulate the position of the slide gate as a function of the fuel density.

The chamber of the control valve can then notably be delimited by the additional movement-controlling section of the slide gate, the pressure of the chamber being exerted on the additional movement-controlling section of the slide gate.

The cylinder further has two orifices opening into the chamber, the flow extraction line connecting the high-pressure line and one of the two orifices, whilst the flow return line connects the other orifice to the high-pressure line.

The pump may be a displacement pump.

The invention also relates to a turbomachine comprising a fuel metering circuit according to the preceding description.

According to another object, the invention relates to a fuel metering method implemented in a fuel metering circuit according to the preceding description, the metering method comprising the feeding of the fuel metering element with a regulated fuel flow rate as a function of a difference in fuel pressure at the terminals of the metering element and as a function of the fuel density.

Advantageously, but optionally, when implementing the fuel metering method, the controlling of the fuel flow feeding the metering element comprises recirculation of a variable fuel flow towards the pump by means of the control valve, and the controlling of the recirculated flow comprises the application, on a control section of said valve, of a fuel pressure solely dependent on the fuel density.

The proposed invention allows increased precision in fuel metering via modulation, upstream of the metering element, of the fuel flow delivered to the metering element as a function of the fuel density.

The proposed modulation allows reduced imprecision of fuel metering. Furthermore, modulation is implemented hydraulically at a control valve. It simplifies the control electronics of the metering element.

DESCRIPTION OF THE FIGURES

Other characteristics, objectives and advantages of the invention will become apparent from the following description given solely for illustration purposes and nonlimiting, and is to be read in connection with the appended drawings in which.

DETAILED DESCRIPTION OF AT LEAST ONE EMBODIMENT

Figure 1:
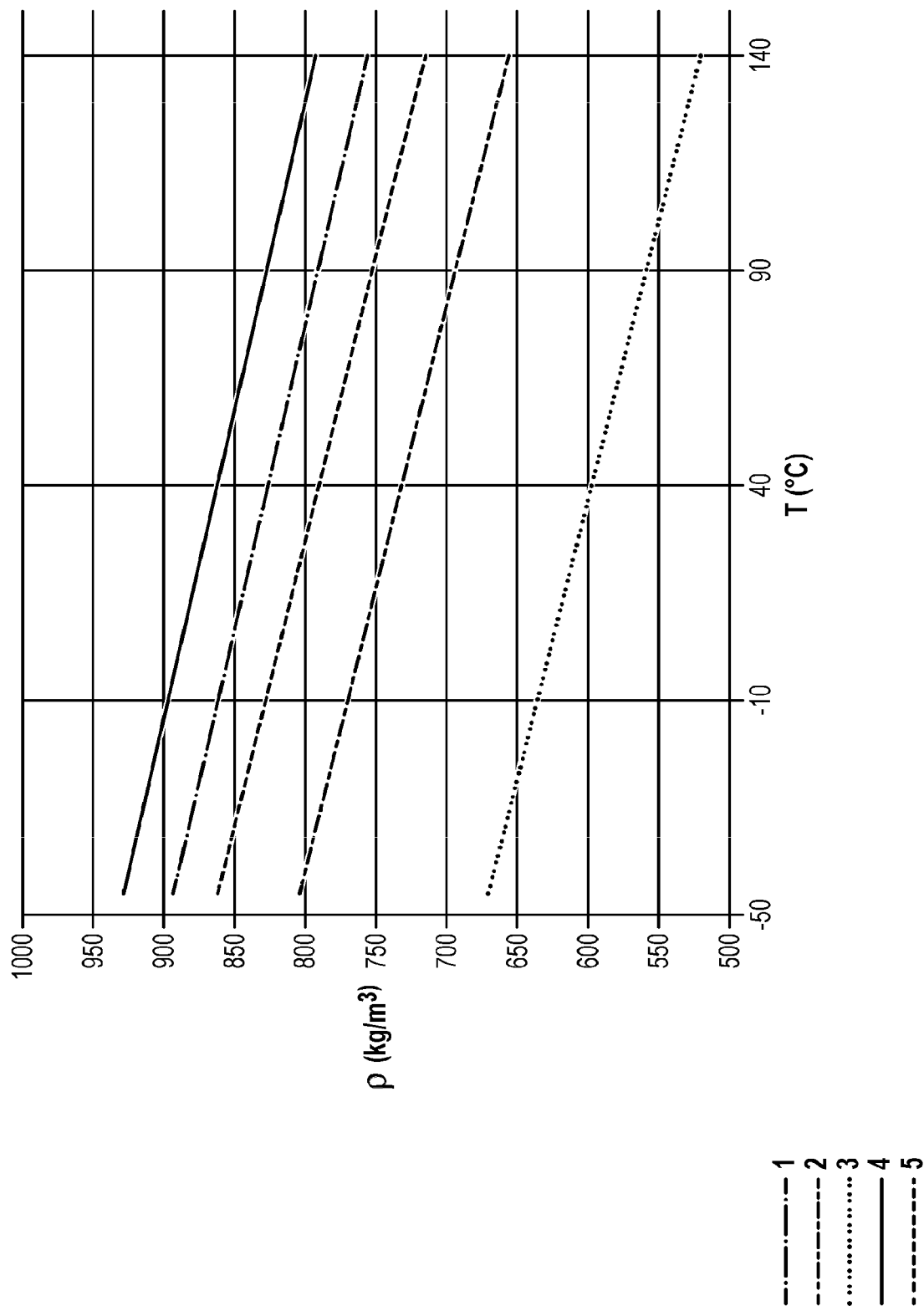
FIG. 1, already described, illustrates the variation in density of several fuels as a function of temperature.
Figure 2:
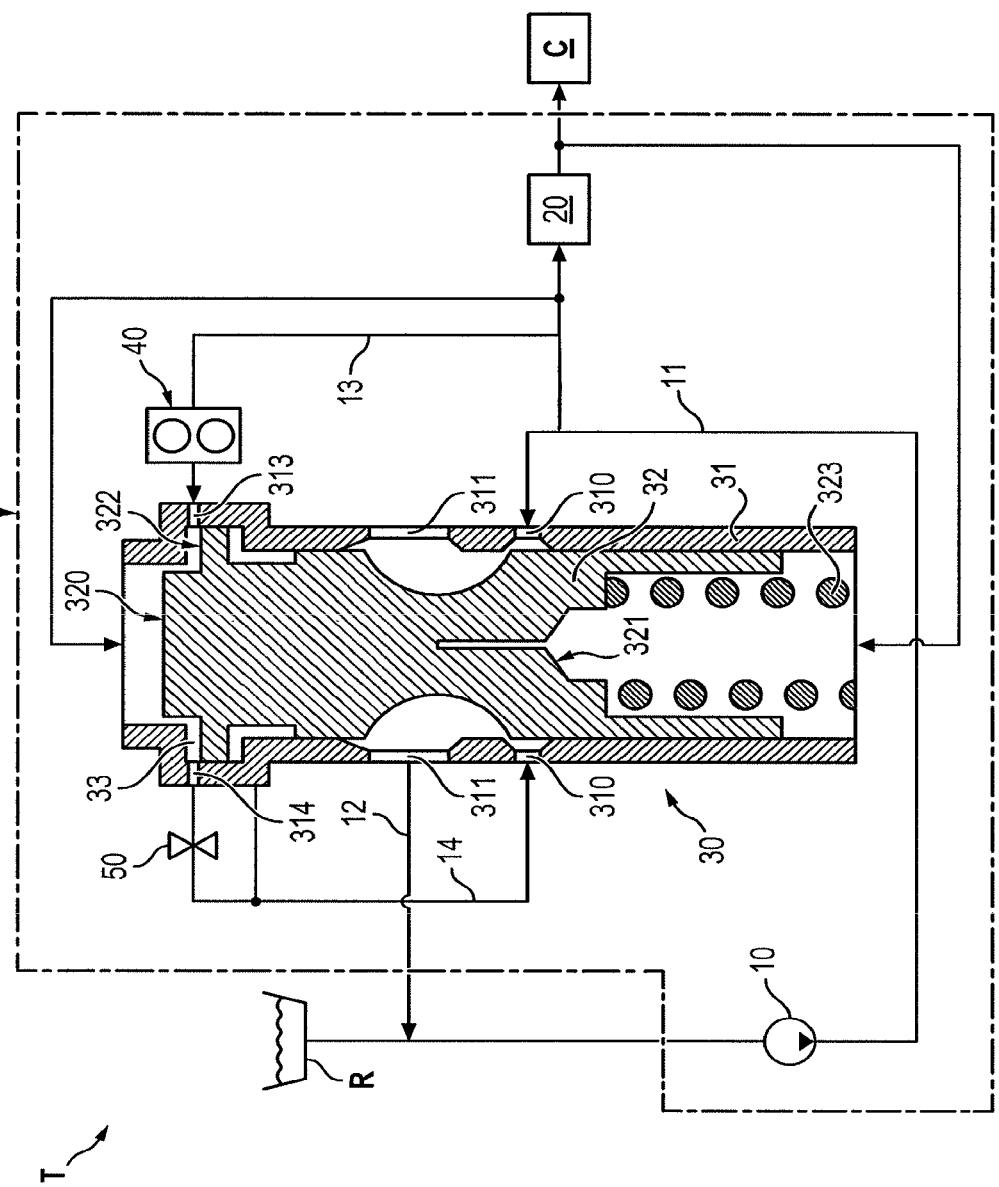
FIG. 2 schematically illustrates a metering circuit according to one embodiment of the invention.

With reference to FIG. 2, a fuel metering circuit 1 is illustrated of a turbomachine T comprising at least one combustion chamber C and a fuel tank R.

The fuel metering circuit 1 comprises a displacement pump 10, a metering element 20, and a metering element feed line 11 called a high-pressure line, connecting the outlet of the displacement pump 10 to the inlet of the metering element 20. The metering element 20 is adapted to deliver a target mass flow to the combustion chamber C from an initial flow it receives from the displacement pump 10 via line 11.

The fuel metering circuit 1 further comprises a control valve 30 adapted to control the flow delivered to the metering element 20. In particular, the control valve 30 is adapted to return an excess fuel flow reaching the metering element 20 back to the inlet of the displacement pump 10 as a function of the difference in pressure at the terminals of the metering element 20.

To do so, the control valve 30 comprises a cylinder 31 and a slide gate 32 mobile in translation within the cylinder 31.

The slide gate 32, at its ends, comprises two movement-controlling sections 320, 321, which allow controlling of the position of the slide gate in the cylinder. A first control section 320 is connected to the high-pressure line 11. It therefore receives a fuel flow at the same pressure as the fuel delivered to the inlet of the metering element 20.

A second control section 321 is connected to an outlet of the metering element.

In addition, the cylinder 31 comprises a first inlet orifice 310 connected to the high-pressure line 11, and a second outlet orifice 311 connected to a low-pressure return line 12, this line connecting the orifice 311 with the inlet of the displacement pump 10. By orifice, it is meant an evacuation opening placing in communication an inner cavity of the valve 30 with a fuel circulation line, irrespective of the geometry of the opening. For example, an orifice can extend over all or part of the circumference of the cylinder.

The slide gate 32 is further conformed so that, as a function of its position in the cylinder, it selectively authorizes or prohibits communication of fluid between the orifices 311 and 310, and modulates the flow of fluid circulating from line 11 towards line 12 passing through the orifices 310 and 311 of the valve 30, when said fluid communication is authorized.

In particular, an increase in the fuel pressure applied to the first control section 320 causes movement of the cylinder towards the opposite section (in FIG. 2, downwardly), which tends to clear at least one of the orifices to increase the flow recirculated towards line 12.

In addition, the control valve advantageously comprises a return member 323, e.g. a spring pressing against the second control section 321, to return the slide gate to an equilibrium position when the pressure applied to the first control section is decreased.

This allows controlling of the flow upstream of the metering element as a function of the difference in fuel pressure at the terminals of the metering element.

The fuel control valve 30 is further adapted to modulate the fuel flow recirculated towards the pump 10 as a function of the fuel density, to take into account the variability in fuel density as close as possible to the metering element, and to reduce imprecision in the metering of fuel delivered to the combustion chamber.

For this purpose, the slide gate 32 of the fuel control valve 20 further comprises an additional control section 322, which also controls the position of the slide gate 32 in the cylinder.

Inside the cylinder 31 of the valve there is defined a chamber adjacent the additional control section 322. The chamber is delimited on one side by this additional section, so that the fluid pressure contained by the chamber 33 is able to be applied onto the additional control section 322.

In addition, the cylinder 31 comprises two additional orifices 313, 314, these orifices opening into said chamber 33.

The fuel metering circuit 1 further comprises a flow extraction line 13, the upstream end of which is connected to the high-pressure line 11, and a downstream end is connected to one of the orifices 313.

The flow extraction line 13 comprises a pump 40 adapted to deliver to the chamber 33, via orifice 313, a constant fuel flow taken from the high-pressure line 11. The fuel pressure delivered by the pump 40 is therefore higher than the pressure of the fuel in the high-pressure line 11.

To ensure constant flow extraction, the pump 40 is a displacement pump, the technology of which is selected to have a very high volume yield, and being scarcely sensitive to ageing.

The fuel metering circuit 1 further comprises a flow return line 14, of which one upstream end is connected to the other orifice 314, and a downstream end is connected to the high-pressure line 11. In one embodiment, the downstream end of the return line 14 is directly connected to the inlet orifice 310 for recirculation of fuel.

The return line 14 further comprises a diaphragm 50, of known geometry.

The fuel pressure leaving the diaphragm is equal to the pressure in the high-pressure line 11.

Therefore, the pressure entering the diaphragm is equal to the outgoing pressure together with the head loss induced by the diaphragm on the fuel flow.

Yet the head loss induced by the diaphragm is formulated as follows:

$$\frac{1}{2}\rho\xi v^2$$

Where $\rho$ is the density of the fluid, $\xi$ is the head loss coefficient of the diaphragm which is constant, and $v$ is the rate of fuel flow in the diaphragm, which is dependent on the upstream flow and on the geometry of the diaphragm (constant).

The fact that the flow upstream of the diaphragm is constant, since it is the flow withdrawn by the pump 40, implies that the head loss is only dependent on the fuel density.

It follows that, the pressure at the outlet of the diaphragm being imposed, the pressure on entering the diaphragm varies solely as a function of the fuel density.

The pressure of the fuel in the chamber 33 is applied on the additional control section 322. As a result, together with controlling of the position of the slide gate in the cylinder as a function of the difference in pressure at the terminals of the metering element 20, there is further controlling as a function of the variations in fuel density.

It follows that the flow delivered to the metering element 20 is already adapted to accommodate the variations in fuel density, and that these variations no longer impact the mass flow metered by the metering element.

Figure 3:
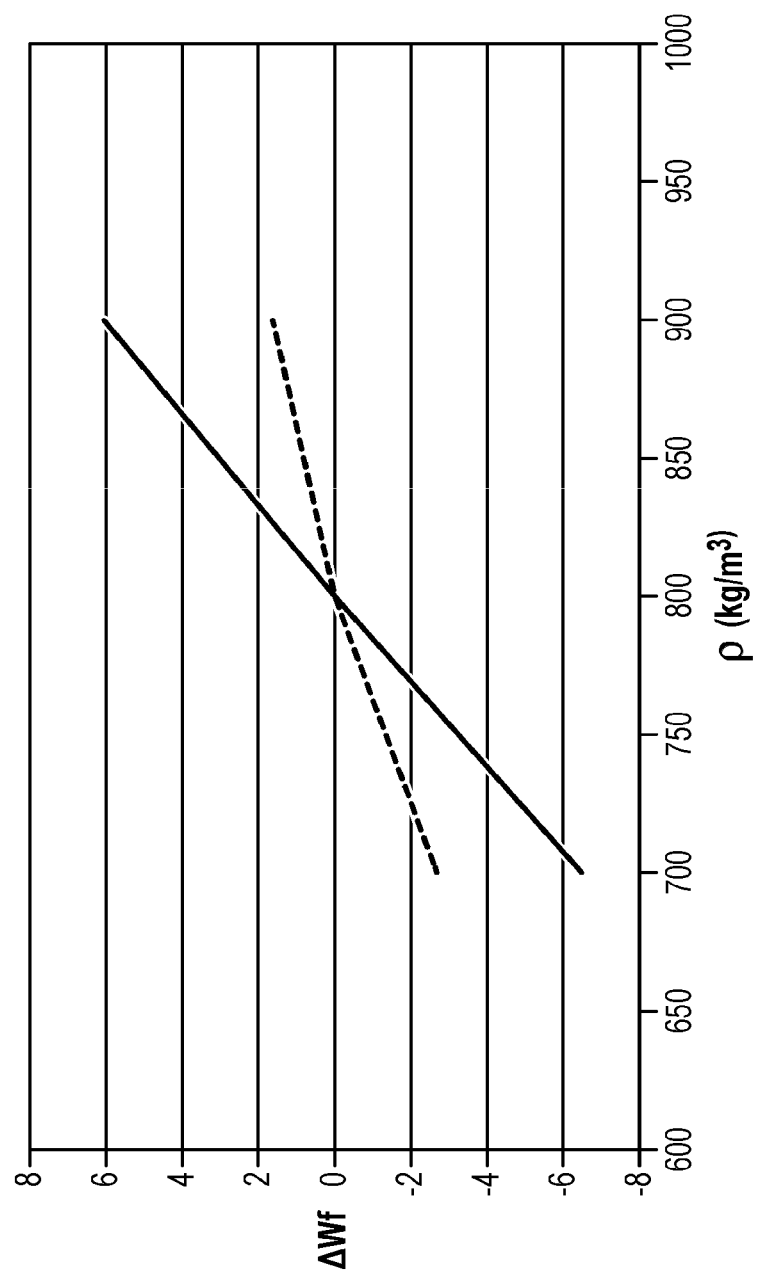
FIG. 3 illustrates the impact on metering precision of flow modulation implemented by the control valve as a function of fuel density.

With reference to FIG. 3, the modelling on existing equipment is illustrated, obtained using AMESim® software, to estimate the impact of variation in fuel density of between 700 and 900 kg/m$^3$ on the metering precision of the metering element, respectively with and without the previously described control. The density $\rho$ of the fuel is given along the X-axis, and the Y-axis gives the percentage variation $\Delta V V f$ of the metered flow Wf relative to a flow at a density $\rho=800$ kg/m$^3$. The solid line curve corresponds to no control and the dotted line curve was obtained with the control.

It is ascertained that in the absence of control, the variation in density leads to a variation in flow of −6.4% to 6.1%, whilst with control the variation in flow is between −2.7% and +1.6%. The controlling of the flow delivered to the metering element as a function of variability in fuel density therefore allows a reduction of more than 30% in the imprecision of injected flow. Furthermore, this controlling is implemented automatically, without the addition of electronic equipment which would increase the complexity of metering element control.

The invention claimed is:

1. A fuel metering circuit for turbomachine, comprising:
   a fuel metering element,
   a pump adapted to circulate a fuel flow towards the metering element, and
   a control valve adapted to return, towards the pump, an excess fuel flow delivered to the metering element, as a function of a difference in fuel pressure at terminals of the metering element,
   the control valve being adapted to modulate the excess flow returned towards the pump as a function of variations in fuel density delivered to the metering element,
   said fuel metering circuit further comprising a high-pressure line for feeding the metering element and a low-pressure line for returning to the pump,
   wherein the control valve comprises a cylinder and an inlet orifice arranged in the cylinder and connected to the high-pressure line,
   wherein said metering element comprises:
      a flow extraction line connecting the high-pressure line to a chamber of the control valve, said flow extraction line comprising a pump adapted to deliver to said chamber a constant fuel flow at a pressure higher than the pressure of the fuel in the high-pressure line, and
      a flow return line connecting the chamber to a fuel recirculation inlet of the high-pressure line, said flow return line comprising a diaphragm,
   said flow extraction line and said flow return line ensuring the feeding of the chamber with a constant fuel flow the pressure of which is solely dependent on the fuel density.

2. The metering circuit according to claim 1, wherein the control valve comprises:
   a slide gate mobile in translation within the cylinder, and
   an outlet orifice arranged in the cylinder and connected to the low-pressure line, the control valve being conformed so that movement of the slide gate in the cylinder causes a variation in the fuel flow circulating from the inlet orifice to the outlet orifice, the slide gate comprising two movement-controlling end sections, respectively connected to the high-pressure line and low-pressure line, and further comprising an additional movement-controlling section adapted to modulate the position of the slide gate as a function of the fuel density.

3. The metering circuit according to claim 2, wherein the chamber of the control valve is delimited by the additional movement-controlling section of the slide gate, the pressure of the chamber being exerted on the additional movement-controlling section of the slide gate.

4. The metering circuit according to claim 2, wherein the cylinder has first and second orifices opening into the chamber, the flow extraction line connecting the high-pressure line and the first orifice, and the flow return line connects the second orifice to the high-pressure line.

5. The fuel metering circuit according to claim 1, wherein the pump of the flow extraction line is a displacement pump.

6. A turbomachine, comprising a fuel metering circuit according to claim 1.

7. A fuel metering method implemented in a fuel metering circuit according to claim 1, the metering method comprising:

feeding the fuel metering element with a regulated fuel flow rate as a function of a difference in fuel pressure at the terminals of the metering element and as a function of the fuel density.

8. The fuel metering method according to claim 7, wherein the controlling of the fuel flow feeding the metering element comprises recirculation of a variable fuel flow towards the pump with the control valve, and the controlling of the recirculated flow comprises the application, on a control section of said valve, of a fuel pressure solely dependent on the fuel density.

* * * * *